(12) United States Patent
Watanabe (10) Patent No.: US 8,991,288 B2
(45) Date of Patent: Mar. 31, 2015

(54) MACHINE TOOL SYSTEM (71) Applicant: Murata Machinery, Ltd., Kyoto-shi, Kyoto (JP)

(72) Inventor: Masayuki Watanabe, Inuyama (JP)

(73) Assignee: Murata Machinery, Ltd., Kyoto-shi (JP)

( * ) Notice: Subject to any disclaimer, the term of this patent is extended or adjusted under 35 U.S.C. 154(b) by 43 days.

(21) Appl. No.: 13/970,820

(22) Filed: Aug. 20, 2013

(65) Prior Publication Data
US 2013/0333532 A1 Dec. 19, 2013

Related U.S. Application Data (63) Continuation of application No. PCT/JP2012/053509, filed on Feb. 15, 2012.

(30) Foreign Application Priority Data

Mar. 24, 2011 (JP) ................................. 2011-065208

(51) Int. Cl.
*B23B 17/00* (2006.01)
*B23B 13/04* (2006.01)
(Continued)

(52) U.S. Cl.
CPC ................ *B23B 13/04* (2013.01); *B23Q 1/015* (2013.01); *B23Q 7/04* (2013.01); *B23Q 39/023* (2013.01); *B23Q 11/0032* (2013.01)
USPC .................... 82/124; 82/129; 82/125; 82/149; 409/235

(58) Field of Classification Search
CPC ...... B23B 13/04; B23Q 1/015; B23Q 39/023; B23Q 7/04; B23Q 7/10; B23Q 11/0032
USPC ............ 82/124, 149, 125, 129; 409/235, 238, 409/159, 164
IPC ........................................................ B23B 17/00
See application file for complete search history.

(56) References Cited

U.S. PATENT DOCUMENTS 1,422,140 A * 7/1922 Sears ............................ 29/38 C
1,528,971 A * 3/1925 Groene .......................... 82/117
(Continued)

FOREIGN PATENT DOCUMENTS

JP 04-244342 A 9/1992
JP 05-337778 A 12/1993
(Continued)

OTHER PUBLICATIONS

International Search Report for PCT/JP2012/053509, Mailing Date of Apr. 24, 2013.
(Continued)

*Primary Examiner* — Sunil K Singh
*Assistant Examiner* — Sara Addisu
(74) *Attorney, Agent, or Firm* — Westerman, Hattori, Daniels & Adrian, LLP (57) ABSTRACT

The machine tool system includes a machine tool, a loader and a support frame structure. The machine tool includes a bed and a processing equipment disposed above the bed to process a work. The loader includes a guide unit disposed above the machine tool and a movable body movable along the guide unit to load and unload the work relative to the processing equipment. The support frame structure includes left and right stands installed on a floor surface at left and right sides of the bed to support the guide unit from below and a reinforcement member inserted in a throughhole, which is provided in the bed so as to extend in a leftward and rightward direction, in a non-contact fashion without contacting an inner face of the throughhole, with left and right ends thereof connected to vertically halfway portions of the associated stands.

8 Claims, 5 Drawing Sheets

(51) Int. Cl.
*B23Q 1/01* (2006.01)
*B23Q 7/04* (2006.01)
*B23Q 39/02* (2006.01)
*B23Q 11/00* (2006.01)

(56) References Cited

U.S. PATENT DOCUMENTS

| | | | | |
|---|---|---|---|---|
| 1,862,516 | A * | 6/1932 | Powell | 29/90.01 |
| 2,040,028 | A * | 5/1936 | Smith et al. | 82/124 |
| 2,369,904 | A * | 2/1945 | McKee | 82/117 |
| 2,405,387 | A * | 8/1946 | Yeomans et al. | 82/122 |
| 2,406,562 | A * | 8/1946 | Reynolds | 82/125 |
| 2,421,450 | A * | 6/1947 | Barrie et al. | 72/13.7 |
| 2,453,947 | A * | 11/1948 | Swift | 144/208.3 |
| 2,564,180 | A * | 8/1951 | Turrettini | 74/89.38 |
| 2,621,552 | A * | 12/1952 | Montanus et al. | 82/149 |
| 2,759,378 | A * | 8/1956 | Youssoufian et al. | 137/263 |
| 2,780,895 | A * | 2/1957 | Silven et al. | 451/246 |
| 2,837,935 | A * | 6/1958 | Deliso | 74/665 GB |
| 2,927,703 | A * | 3/1960 | Smith et al. | 414/626 |
| 3,011,373 | A * | 12/1961 | Waldrich | 82/149 |
| D192,263 | S * | 2/1962 | Gerchow et al. | D15/130 |
| 3,090,284 | A * | 5/1963 | Dunning | 409/134 |
| 3,124,985 | A * | 3/1964 | Curtis et al. | 82/124 |
| 3,436,994 | A * | 4/1969 | Diener et al. | 82/137 |
| 3,534,643 | A * | 10/1970 | Markgraf | 82/149 |
| 3,572,520 | A * | 3/1971 | Evans et al. | 198/346.2 |
| 3,651,958 | A * | 3/1972 | Evans et al. | 414/591 |
| 3,658,190 | A * | 4/1972 | Fournier | 414/591 |
| 3,749,509 | A * | 7/1973 | Lukoshnikov | 408/234 |
| 3,779,109 | A * | 12/1973 | Gibert | 82/124 |
| 3,783,741 | A * | 1/1974 | Schadebrodt et al. | 409/80 |
| 3,785,227 | A * | 1/1974 | Wolff | 82/124 |
| 3,837,245 | A * | 9/1974 | Schuler et al. | 82/149 |
| 3,895,424 | A * | 7/1975 | Hautau | 29/38 C |
| 3,966,058 | A * | 6/1976 | Heffron et al. | 198/346.2 |
| 3,995,524 | A * | 12/1976 | Lederer | 82/125 |
| 4,040,316 | A * | 8/1977 | Gramespacher et al. | 82/149 |
| 4,097,984 | A * | 7/1978 | Petrov | 29/563 |
| 4,175,454 | A * | 11/1979 | Goldstein | 82/86 |
| 4,177,550 | A * | 12/1979 | Sipek et al. | 409/183 |
| 4,279,560 | A * | 7/1981 | Ito et al. | 414/589 |
| 4,317,394 | A * | 3/1982 | Link et al. | 82/124 |
| 4,442,739 | A * | 4/1984 | Swanson et al. | 82/124 |
| 4,476,627 | A * | 10/1984 | Matsuura et al. | 29/791 |
| 4,478,117 | A * | 10/1984 | Brown et al. | 82/149 |
| 4,494,298 | A * | 1/1985 | Matsuura et al. | 29/563 |
| 4,503,798 | A * | 3/1985 | Hergeth | 414/751.1 |
| 4,593,587 | A * | 6/1986 | Nenadal | 82/148 |
| 4,612,690 | A * | 9/1986 | Baker | 29/33 P |
| 4,631,382 | A * | 12/1986 | Fukunaga et al. | 219/69.11 |
| 4,658,485 | A * | 4/1987 | Yang | 29/26 A |
| 4,675,977 | A * | 6/1987 | Kolblin et al. | 483/1 |
| 4,679,297 | A * | 7/1987 | Hansen et al. | 483/1 |
| 4,782,567 | A * | 11/1988 | Kanaya et al. | 29/33 P |
| 4,821,611 | A * | 4/1989 | Myers | 82/1.11 |
| 4,856,752 | A * | 8/1989 | Linn | 248/678 |
| 4,890,241 | A * | 12/1989 | Hoffman et al. | 700/255 |
| 4,951,376 | A * | 8/1990 | Grund | 483/14 |
| 5,081,889 | A * | 1/1992 | Takano et al. | 82/122 |
| 5,083,485 | A * | 1/1992 | Link et al. | 82/124 |
| 5,214,829 | A * | 6/1993 | Minagawa | 29/27 C |
| 5,321,874 | A * | 6/1994 | Mills et al. | 29/33 P |
| 5,353,490 | A * | 10/1994 | Kukuljan | 29/564 |
| 5,375,952 | A * | 12/1994 | Line | 409/202 |
| 5,379,510 | A * | 1/1995 | Berge | 29/564 |
| 5,407,415 | A * | 4/1995 | Spishak | 483/4 |
| 5,425,607 | A * | 6/1995 | Hardesty | 409/238 |
| 5,649,461 | A * | 7/1997 | Camelli | 82/126 |
| 5,704,262 | A * | 1/1998 | Baumbusch et al. | 82/124 |
| 5,857,894 | A * | 1/1999 | Griesbach et al. | 451/5 |
| 5,885,199 | A * | 3/1999 | Shao | 483/19 |
| 5,919,012 | A * | 7/1999 | Nakagawa et al. | 409/132 |
| 5,920,974 | A * | 7/1999 | Bullen | 29/33 K |
| 6,044,735 | A * | 4/2000 | Crippa | 82/124 |
| 6,068,431 | A * | 5/2000 | Line | 409/202 |
| 6,279,224 | B1 * | 8/2001 | Wirtz et al. | 29/711 |
| 6,298,531 | B1 * | 10/2001 | Baumbusch et al. | 29/40 |
| 6,302,315 | B1 * | 10/2001 | Thompson | 228/112.1 |
| 6,325,578 | B1 * | 12/2001 | Szuba et al. | 409/238 |
| 6,357,094 | B1 * | 3/2002 | Sugimoto | 29/27 C |
| 6,409,642 | B1 * | 6/2002 | Tominaga et al. | 483/16 |
| 6,732,618 | B1 * | 5/2004 | Schreiber et al. | 82/149 |
| 6,745,454 | B1 * | 6/2004 | Grimshaw et al. | 29/563 |
| 6,798,088 | B2 * | 9/2004 | Hsu et al. | 310/12.13 |
| 6,804,880 | B2 * | 10/2004 | Yamamoto | 29/700 |
| 7,232,406 | B2 * | 6/2007 | Komizo | 483/3 |
| 7,240,411 | B2 * | 7/2007 | Matsumoto et al. | 29/27 C |
| 7,273,335 | B2 * | 9/2007 | Furuhashi et al. | 409/202 |
| 7,325,667 | B1 * | 2/2008 | Damick et al. | 198/395 |
| 7,367,096 | B2 * | 5/2008 | Sammartin et al. | 29/27 C |
| 7,467,449 | B1 * | 12/2008 | Lee et al. | 29/26 A |
| 7,509,718 | B1 * | 3/2009 | Mischler et al. | 29/33 P |
| 7,650,982 | B2 * | 1/2010 | Tachibana et al. | 198/341.01 |
| 7,682,112 | B2 * | 3/2010 | Panczuk et al. | 409/132 |
| 7,797,074 | B2 * | 9/2010 | Hyatt et al. | 700/164 |
| 8,047,106 | B2 * | 11/2011 | Chang | 82/117 |
| 8,082,643 | B2 * | 12/2011 | Hegener et al. | 29/28 |
| 8,136,214 | B2 * | 3/2012 | Hessbruggen | 29/27 C |
| 8,229,586 | B2 * | 7/2012 | Wallace et al. | 700/112 |
| 8,397,375 | B2 * | 3/2013 | Mertens et al. | 29/711 |
| 8,662,802 | B2 * | 3/2014 | Mischler | 409/235 |
| 8,806,996 | B2 * | 8/2014 | Cooper | 82/47 |
| 2001/0042424 | A1 * | 11/2001 | Sheehan et al. | 82/121 |
| 2001/0054535 | A1 * | 12/2001 | Faitel | 198/346.3 |
| 2002/0011137 | A1 * | 1/2002 | Nakaminami et al. | 82/117 |
| 2002/0047319 | A1 * | 4/2002 | Ferrari et al. | 310/12 |
| 2002/0131836 | A1 * | 9/2002 | Ferrari et al. | 409/212 |
| 2004/0077470 | A1 * | 4/2004 | Camozzi et al. | 483/31 |
| 2005/0022351 | A1 * | 2/2005 | Tokuma et al. | 29/27 C |
| 2005/0031427 | A1 * | 2/2005 | Hiramoto et al. | 409/137 |
| 2005/0076756 | A1 * | 4/2005 | Andonegui Milicua | 82/124 |
| 2008/0041202 | A1 * | 2/2008 | Herfurth et al. | 82/132 |
| 2008/0066591 | A1 * | 3/2008 | Yamane et al. | 82/121 |
| 2008/0282854 | A1 * | 11/2008 | Momoi et al. | 82/1.11 |
| 2008/0314211 | A1 * | 12/2008 | Clay | 82/149 |
| 2009/0252587 | A1 * | 10/2009 | Mischler et al. | 414/704 |
| 2012/0006163 | A1 * | 1/2012 | Taira et al. | 82/152 |

FOREIGN PATENT DOCUMENTS

| | | |
|---|---|---|
| JP | 07-040102 A | 2/1995 |
| JP | 11-030556 A | 2/1999 |
| JP | 11-300556 A | 11/1999 |
| JP | 3719167 A | 11/2005 |
| JP | 3719167 B2 | 11/2005 |
| JP | 2008-060614 A | 3/2008 |

OTHER PUBLICATIONS

Notification of Transmittal of Translation of the International Preliminary Report on Patentabililty (Form PCT/IB/338) of International Application No. PCT/JP2012/053509 mailed Oct. 3, 2013 with Forms PCT/IB/373 and PCT/ISA/237.

* cited by examiner

PRIOR ART

MACHINE TOOL SYSTEM

CROSS REFERENCE TO THE RELATED APPLICATION

This application is a continuation application, under 35 U.S.C. §111(a) of international application No. PCT/JP2012/053509, filed Feb. 15, 2012, which claims priority to Japanese patent application No. 2011-065208, filed Mar. 24, 2011, the entire disclosure of which is herein incorporated by reference as a part of this application.

BACKGROUND OF THE INVENTION

1. Field of the Invention

The present invention relates to a machine tool system including a machine tool such as, for example, a lathe and a loader to load and unload a work onto and from the machine tool one at a time.

Figure 5:
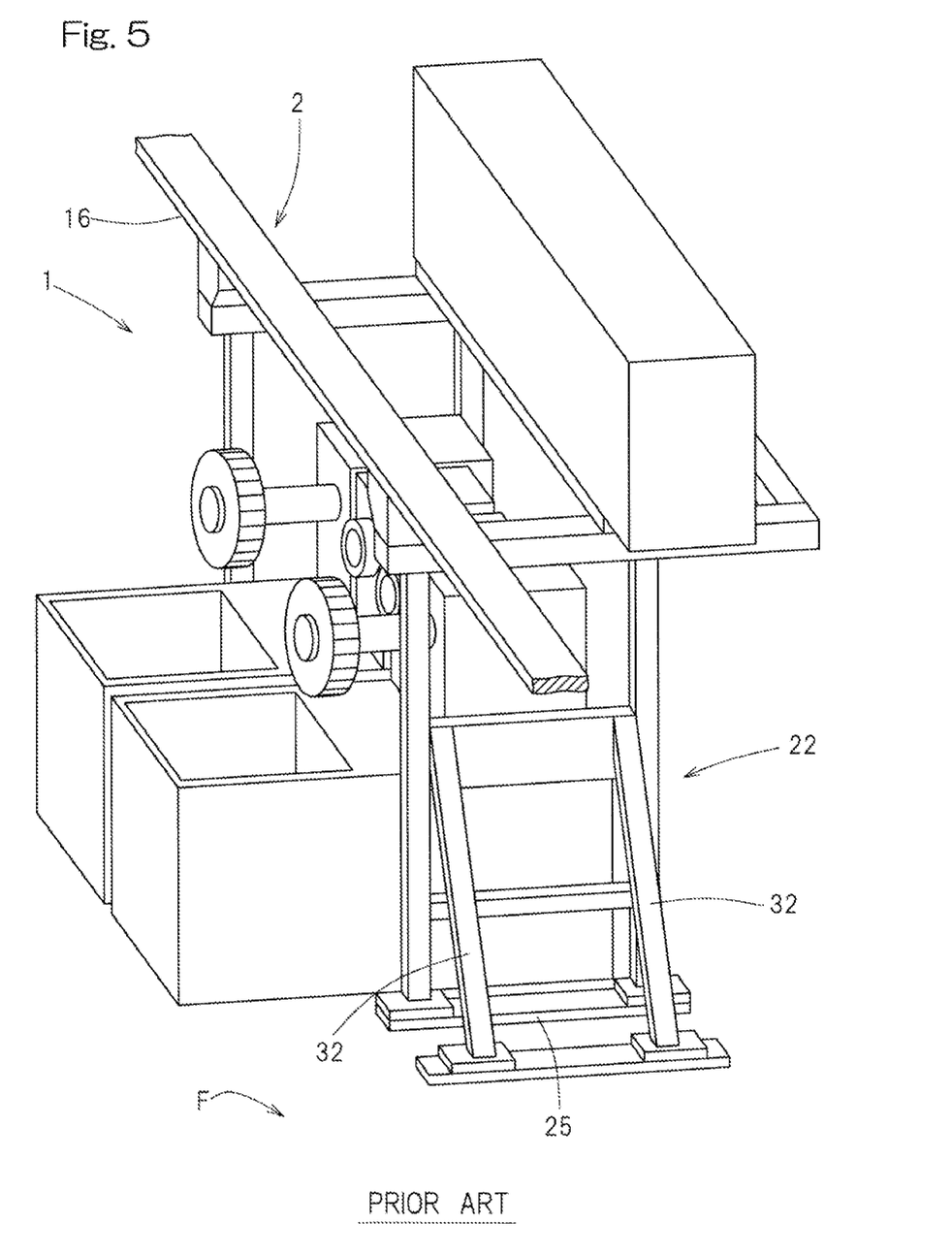
FIG. 5 is a schematic perspective view showing the prior art machine tool system.

2. Description of Related Art

Where the machine tool is for example, a lathe, as shown in FIG. 5, a loader 2 selectively loads and unloads a work onto and from the lathe 1 (which is shown as employed in the form of a parallel double spindle type lathe 1 in this instance now under discussion) one at a time. The loader 2 includes a movable body (not shown) such as, for example, a loader head, then supporting a work. The movable body is horizontally movable along a travel rail 16 arranged above the lathe 1 to selectively load and unload the work onto and from the lathe 1 respectively. If the travel rail 16 is supported by a frame fixed to the lathe 1, vibrations brought about by the movement of the movable body are transmitted to the lathe 1, thus adversely affecting the processing accuracy of the lathe 1.

In view of the above, the travel rail 16 is generally supported by stands 22 installed respectively on a floor surface at left and right sides of the lathe 1. Where the stands 22 are fixed by anchoring on the floor surface, the height between the floor surface and the travel rail 16 is large. Accordingly, in order to secure the strength of each of the stands 2, the surface area of each of anchor plates 25 has been increased or reinforcement has been made in such a way (as shown in FIG. 5) as to employ a reinforcement frame 32 that protrudes considerably in a direction laterally outwardly of each of the stands 22.

Also, in a machine tool such as, for example, the parallel double spindle type lathe in which a plurality of processing equipments are installed on independent beds, a structure has been known, in which in order to avoid the transmission of vibrations occurring in one of the processing equipments to the other processing equipment or equipments, a common machine control panel is installed on a gate type frame then straddling those beds. In this respect, see, for example, the patent document 1 listed below.

PRIOR ART LITERATURE

[Patent Document 1] Japanese Patent No. 3719167

Either increasing the surface area of each of the anchoring plate 25 or using the reinforcement frame 32 for each of the stands 22 requires a large space for installation on left and right sides of the machine tool such as, for example, the lathe. For this reason, a large limitation is imposed in installing the machine tool in a factory.

SUMMARY OF THE INVENTION

A machine tool system is provided in which a stand for a support frame to support the loader disposed above the machine tool can be installed in a minimized space without allowing the vibrations, brought about by the movement of the movable body of the loader, to the machine tool.

There is provided a machine tool system comprising a machine tool, a loader to load and unload a work relative to the machine tool, and a support frame structure to support the loader. In this machine tool system, the machine tool referred to above includes a bed and a processing equipment disposed above the bed to process to a work. The loader referred to above includes a guide unit disposed above the machine tool and a movable body movable along the guide unit to load and unload the work onto and from the processing equipment of the machine tool. The support frame structure referred to above includes left and right stands disposed on a floor surface on left and right sides of the bed to support the guide unit from below, and a reinforcement member, which is inserted in a throughhole defined in the bed so as to extend in a leftward and rightward direction, in a non-contact fashion without contacting an inner face of such throughhole and which has left and right ends connected respectively with vertically halfway portions of the left and right stands.

The number of throughholes referred to above is not necessarily limited to one, but a plurality of throughholes may be employed, and, also, the respective positions of the left and right ends of the throughhole may be displaced in a vertical direction or in an anteroposterior direction. More specifically, the throughhole referred to above may be formed by side wall holes provided in, for example, left and right side walls of the hollow bed and those side wall holes may be displaced in a vertical direction or in an anteroposterior direction.

According to the features outlined above, since vertically halfway portions of the left and right stands are connected together through a reinforcement member, each of those stands is effectively reinforced. Accordingly, the need to increase the surface area of the anchor plate and/or to provide each of the stands with a reinforcement frame that protrudes considerably in a direction laterally of the stand is eliminated and, therefore, the stands can be installed in a limited narrow space.

Since the reinforcement member is inserted in a non-contact fashion inside the inner face of the throughhole, vibrations induced as a result of movement of the movable body along the guide unit are not transmitted to the processing equipment of the machine tool. The bed of the machine tool is generally in the form of a casting, and the site at which a core is disposed during the casting is therefore left as a vacant space. By properly tailoring the position of the core, it is quite easy to use the vacant space, formed by the core, as the throughhole that extends in a leftward and rightward direction. Also, it is quite often that the bed is provided with a thin walled portion and/or an opening in order to reduce the weight and/or to save the material. For this reason, even though the throughhole referred to above is employed, a problem associated with the lack of a sufficient strength will not occur if the bed is properly designed.

In a preferred embodiment of the present invention, the reinforcement member may be employed in a plural number at front and rear. In this case, at least one of the reinforcement members is inserted through the throughhole in the non-contact fashion without contacting the inner face of such throughhole while the remaining reinforcement member or members is/are disposed without being inserted through the throughholes.

If the reinforcement member is employed in a plural number at front and rear, the stands can be further reinforced. In this case, if at least one of the reinforcement members may be inserted into the throughhole, and the remaining reinforcement member or members may not be inserted. The plurality of the reinforcement members has to be properly disposed in consideration of the anteroposterior length of the machine tool.

In another preferred embodiment of the present invention, the machine tool may be a parallel double spindle type lathe having two spindles, which define the processing equipments, extending leftwardly and rightwardly parallel to each other, in which case two beds having the respective spindle installed thereon are separate from each other and are disposed left and right, those two beds being provided with the throughholes that extend leftwards and rightwards. The reinforcement member is inserted through the two throughholes in the associated beds in a non-contact fashion without contacting inner faces of those throughholes.

Even with this construction, the stands can be effectively reinforced by connecting the vertically halfway portions of the left and right stands together through the reinforcement member. Accordingly, the stands can be installed in the limited narrow space.

In a further preferred embodiment of the present invention, the machine tool may include two upper and lower reinforcement members and the left and right stands are connected with each other in diagonal bracing by means of the two reinforcement members. According, to this structural feature, since the left and right stands are connected together in diagonal bracing by means of the two reinforcement members, the strength of each of the stands can be increased, and also, the rigidity of the support frame structure as a whole is also increased. Accordingly, the stands can be installed in the limited narrow space.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 2:
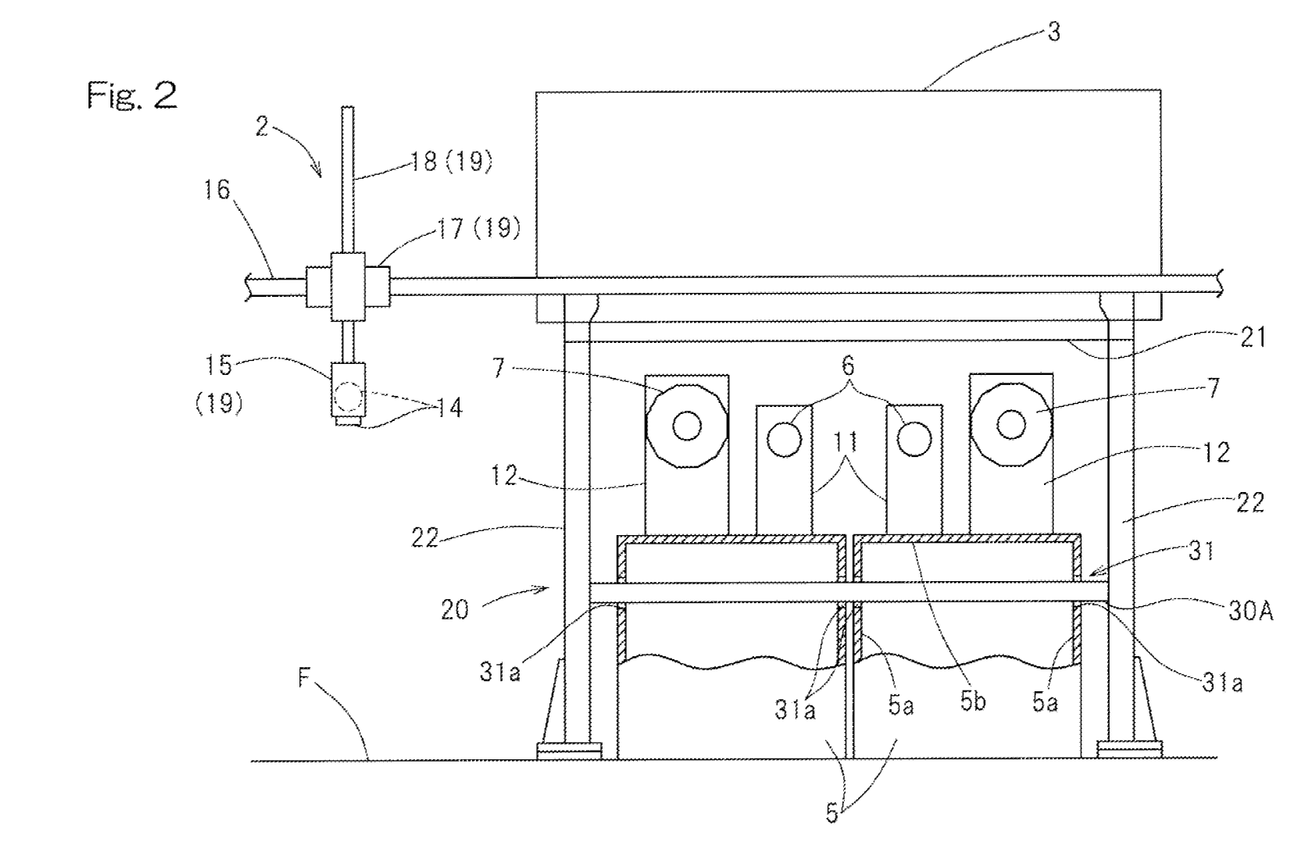
FIG. 2 is a front elevational view showing the machine tool system.
Figure 3:
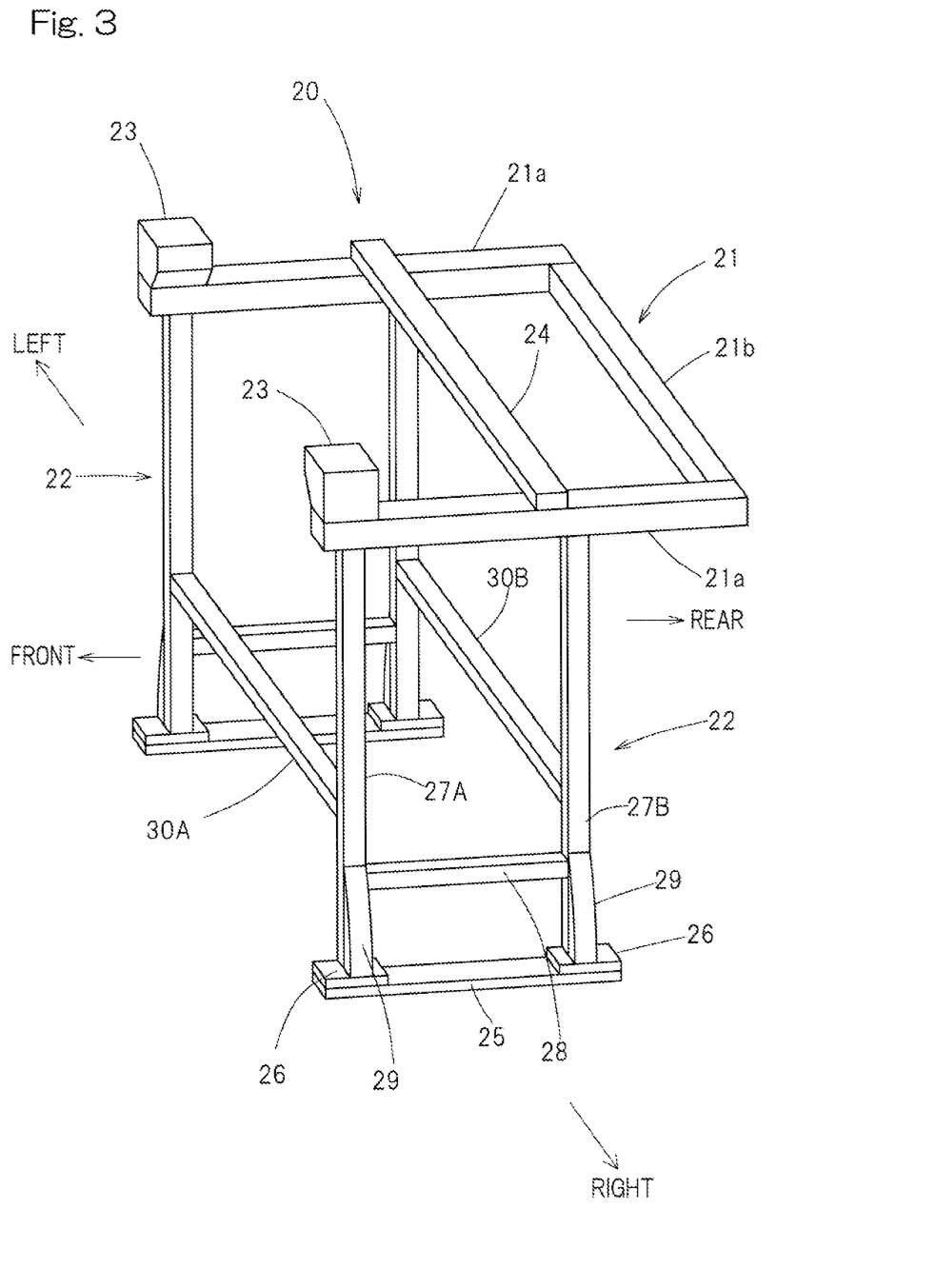
FIG. 3 is a perspective view showing a support frame structure for the machine tool system.

A first preferred embodiment of the present invention will be described in detail with particular reference to FIGS. 1 to 3. A machine tool system shown therein includes a parallel double spindle type lathe 1 which defines a machine tool, a loader 2 to load and unload a work onto and from the machine tool, and a control console 3.

The parallel double spindle lathe 1 includes left and right beds 5 that are placed on a floor surface F independently from each other, and a spindle 6 and a tool post 7, which form respective parts of a processing equipment, are disposed on a rear potion of each of the beds 5. At a front portion of each of the beds 5, a chipping receptacle 8 in the form of a recess is provided for accommodating chips produced as a result of processing. The rear portion of each of the beds 5 is in the form of a box-like hollow basically delimited by side walls 5a and a top wall 5b as shown in FIG. 2. The left and right side walls 5a of each of the left and right beds 5 are provided with side wall hole 31a that altogether define a throughhole 31 for the passage of a reinforcement material 30A as will be detailed later. Although in the illustrated embodiment now under discussion, a vertical position and an anteroposterior position of each of the side wall holes 31a are shown as aligned with each other, the position of each of the side wall holes 31a may be displaced in the vertical direction and/or the anteroposterior direction. Where a partition plate (not shown) is provided within the beds 5 in a fashion crossing the throughhole 31, this partition plate has to be provided with a hole (not shown) extending to both sides in alignment with the side wall holes 31a.

Figure 1:
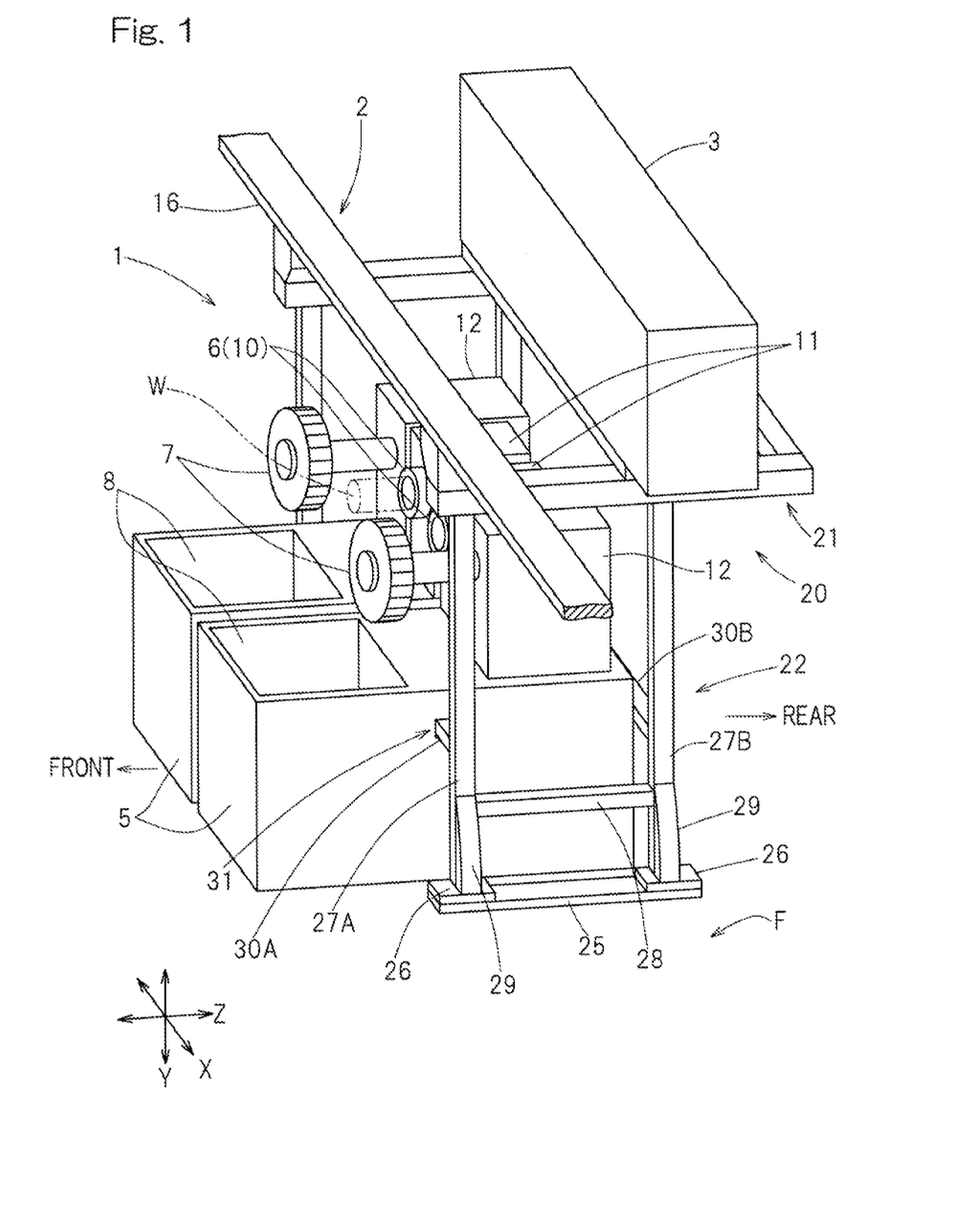
FIG. 1 is a perspective view showing a machine tool system designed in accordance with a first preferred embodiment of the present invention.

The spindles 6 include shafts that extend in a anteroposterior direction (Z-axis direction) and each of the spindles 6 has a chuck 10 at a front end thereof to hold a work W (best shown in FIG. 1). Each of the spindles 6 is rotatably supported by a headstock 11 mounted on the respective bed 5 and is driven to rotate by a spindle motor (not, shown) installed in the corresponding headstock 11.

The tool posts 7 are in the form of turrets each being, of a polygonal shape when viewed from front, and a plurality of tools (not shown) are fitted to an outer peripheral surface portion of each of those tool posts 7 so that an arbitrarily chosen one of those tools can be rotationally indexed. Each of the tool posts 7 is supported by a corresponding feed slide 12 provided above the associated bed 5 for movement in the anteroposterior direction (Z-axis direction) and the leftward and rightward direction (X-axis direction).

The loader 2 includes a raw material supply unit not shown) and a product delivery unit (not shown), which are disposed on left and right sides of the parallel double spindle type lathe 1, respectively, and operates to convey the work W between each of these units and the spindles 6 of the parallel double spindle type lathe 1. The loader 2 employed in the practice of the illustrated embodiment is of a gantry type in which a loader head 15 holding the work W by means of a loader chuck 14 is movable in the leftward and rightward direction (X-axis direction) and a vertical direction (Y-axis direction) to transport the work W. More specifically, the loader 2 includes a horizontally extending travel rail 16 which forms a guide unit installed above the parallel double spindle type lathe 1, a traveling body 17 capable of traveling along this travel rail 16, and an elevating rod 18 elongated in a vertical direction and capable of selectively ascending and descending relative to the traveling body 17. The loader head 15 is provided at a lower end of the elevating rod 18. The traveling body 17, the elevating rod 18 and the loader head 15 cooperate with each other to define a movable body 19 capable of moving along the travel rail 16.

The travel rail 16 for the loader 2 and the control console 3 are supported by a support frame structure 20. As best shown in FIG. 3, the support frame structure 20 includes an upper frame section 21 to support the travel rail 16 and the control console 3 mounted thereon, and left and right stands 22 and 22 to support the upper frame section 21.

The upper frame section 21 includes left and right side frame members 21a and 21a, that extend in the anteroposterior direction, and a transverse frame member 21b, connecting respective rear ends of the side frame members 21a and 21a, together, and has a top plan shape that represents a U-shape. Each of the side frame members 21a has a front end upper surface provided with a rail mount 23 on which the travel rail 16 rests. Also, a control console mount 24, on which the control console 3 is mounted, is connected to and bridges over respective anteroposterior intermediate portions of the side frame members 21a and 21a.

Each of the left and right stands 22 is vertically disposed on an anchor plate 25, which is adapted to be fixed to a floor surface F, through a plurality of, specifically two front and rear support posts 27A and 27B by way of intervening plates 26 and 26 such as, for example, liners or shims. Respective upper ends of the support posts 27A and 27B are connected to the associated side frame member 21a of the upper frame section 21. Respective lower portions of the front and rear support posts 27A and 27B are connected with each other through a horizontally extending connecting member 28. Also, joints between the support posts 27A and 27B and the intervening plates 26 and 26 are provided with reinforcement elements 29 and 29, respectively, each of those reinforcement elements 29 and 29 being of a front elevational shape representing, for example, a triangular shape. It is, however, to be noted that the use of the reinforcement element 29 may be dispensed with if so desired.

The left and right stands 22 and 22 have vertically halfway portions of the respective support posts 27A and 27B that are connected with each other through transverse reinforcement members 30A and 30B. In the instance as shown, the position of each of the transverse reinforcement members 30A and 30B is so chosen at a position below an intermediate position in the heightwise direction of the corresponding support post 27A and 27B. As best shown in FIG. 1, the front transverse reinforcement member 30A that connects the support posts 27A of the left and right stands 22 is inserted into the throughholes 31, which extend across the left and right beds 5, respectively, in a non-contact fashion without contacting inner faces of those throughholes 31. More specifically, the throughhole 31 is defined by the holes 31a formed in the side walls 5a of each of the beds 5. Also, the rear transverse reinforcement member 30B that connects the support posts 27B of the left and right stands 22 is positioned rearwardly of the left and right beds 5.

With the support frame structure 20 so constructed as hereinabove described, since the left and right stands 22 are connected at their vertically halfway portions with each other through the transverse reinforcement members 30A and 30B, each of those stands 22 is reinforced. Accordingly, there is no need to increase the surface area of each of the anchor plates 25 and/or to provide the stands 22 with the reinforcement frames 32 (as shown in FIG. 5) such as required in the prior art structures, and, therefore, the stands 22 can be installed on a narrow space. Even if the support frame structure 20 is provided with the reinforcement elements 29, those reinforcement elements 29 suffice, because they are much smaller than the reinforcement frames 32 employed in the prior art structure, and the support frame structure can therefore be installed in a narrow space for the stands 22.

Since the front transverse reinforcement member 30A is inserted in the throughholes 31 in the beds 5 in a non-contact fashion without contacting the inner faces of those throughholes 31 as hereinabove described, vibrations occurring when the movable body 19 of the loader 2 is moved are never transmitted to the spindles 6 nor to the tool posts 7 of the parallel double spindle type lathe 1 and, therefore, the processing can be accomplished accurately. The bed 5 of the machine tool including the parallel double spindle type lathe 1 is generally employed in the form of casting and cores used during the casting leave hollows within such castings. With the cores carefully tailored, hollows left by the cores can be easily used as the throughholes 31 that extend leftwards and rightwards. Also, the bed 5 is generally provided with one or more thin walled portions and/or openings when the weight thereof is desired to be reduced and/or for the purpose of reducing materials used. For this reason, even though the throughholes 31 are employed as described above, no problem associated with an insufficient strength will occur when the bed 5 is properly designed.

In the case of the embodiment hereinabove fully described, the use is made of the two transverse reinforcement members 30A and 30B at front and rear, respectively; one of those reinforcement members 30A is inserted through the throughholes 31 and the remaining reinforcement member 30B is disposed without being inserted through the throughholes 31. Thus, it is sufficient that at least one reinforcement member 30A be inserted through the throughholes 31 and the other reinforcement member 30B need not be inserted through the throughholes and that in consideration of the dimension of the machine tool in the anteroposterior direction, the plurality of the reinforcement members 30A and 30B have to be properly disposed. Accordingly, it may be appropriate to use at least one reinforcement member or three or more reinforcement members.

Figure 4:
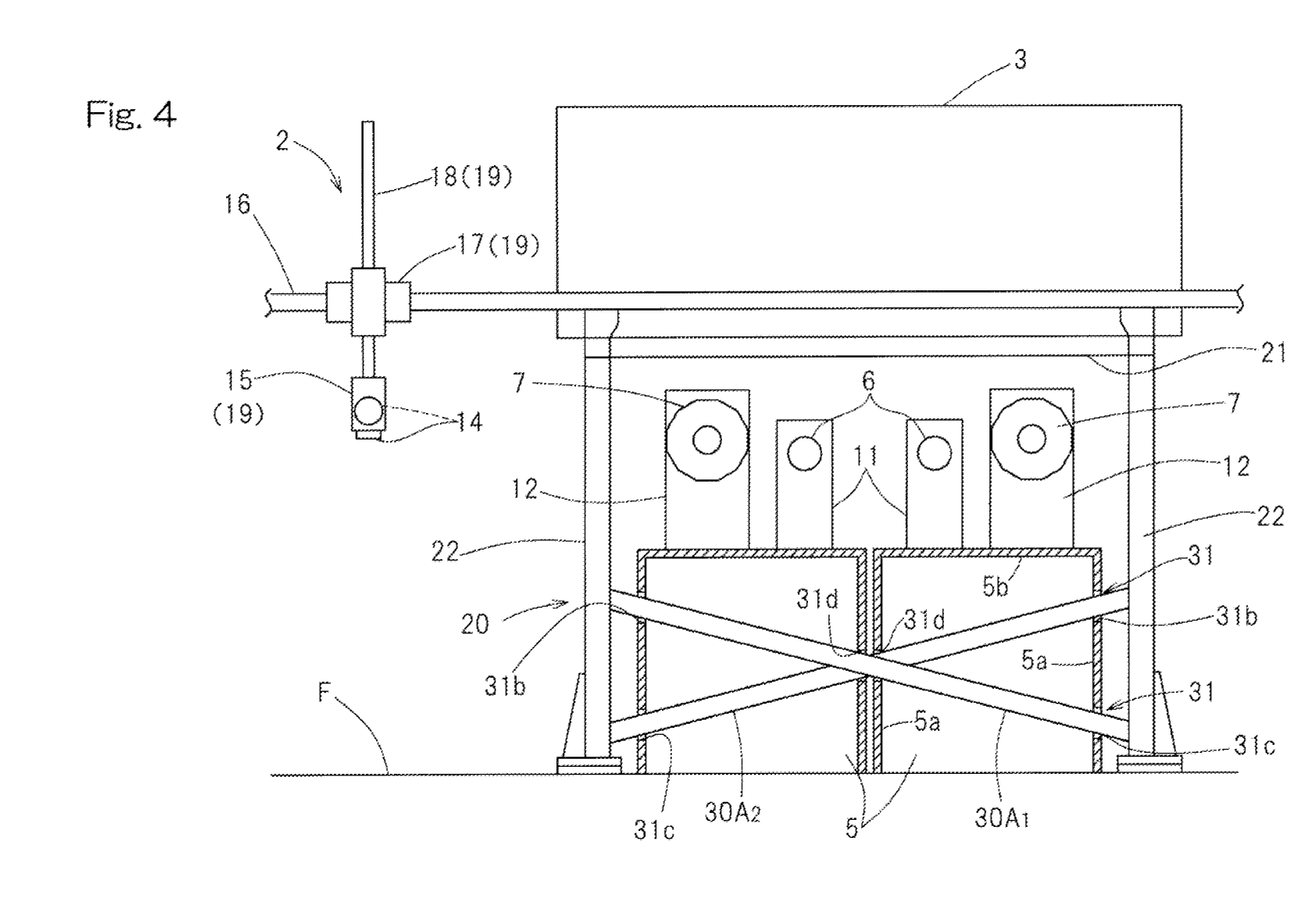
FIG. 4 is a front elevational view showing the machine tool system designed in accordance with a second preferred embodiment of the present invention.

FIG. 4 illustrates a second preferred embodiment of the present invention. The support frame structure 20 of the machine tool system according to this second embodiment is such that the front support posts 27A of the left and right stands 22 are connected together by two reinforcement members 30A1 and 30A2 that are crossed with each other when viewed from the front. Along therewith, the left and right side walls 5a of each of the beds 5 are provided with two throughholes 31 through which each of the reinforcement members 30A1 and 30A2 is inserted. More specifically, side wall holes 31b and 31c are provided at two vertical sites of the left and right outer side walls 5a and a side wall hole 31d is provided at one vertically intermediate site of the inner side walls 5a, and the throughholes 31 are defined by those side wall holes 31b, 31c and 31d. Each of the reinforcement members 30A1, 30A2 is inserted through the throughholes 31 in a non-contact fashion with the inner faces of the throughholes 31. A transverse reinforcement member (not shown) to connect the rear support posts (also not shown) may be constituted by two crossing reinforcement members in a manner similar to the front crossing reinforcement members 30A1 and 30A2 or may alternatively be constituted by a single horizontally extending transverse reinforcement member in a manner similar to that in the previously described first embodiment.

If the front support posts 27A of the left and right stands 22 are connected with each other by means of the two crossing reinforcement members 30A1 and 30A2 as is the case with the support frame structure 20, the strength of each of the stands 22 can be increased, and also, the rigidity of the support frame structure 20 as a Whole can be increased. Accordingly, the stands 22 can be installed in a narrow space. Even in this case, since the reinforcement members 30A1 and 30A2 are inserted in the throughholes 31 in the non-contact fashion without contacting the inner faces thereof, vibrations occurring when the movable body 19 of the loader 2 is moved are never transmitted to the spindles 6 nor to the tool posts 7 of the parallel double spindle type lathe 1 and, therefore, the processing can be accomplished accurately.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing each of the first and second embodiments, the machine tool has been shown and described as employed in the form of the parallel double spindle type lathe 1 in which one pair of the beds 5 are employed with those beds 5 independent of each other, the left and right beds 5 may be connected together or may be formed integrally with each other without being separated from each other.

Also, the machine tool that can be employed in the practice of the present invention may be a single spindle lathe or any machine other than the lathe.

Accordingly, such changes and modifications are, unless they depart from the scope of the present invention as delivered from the claims annexed hereto, to be construed as included therein.

REFERENCE NUMERALS

1 . . . Parallel double spindle lathe (Machine tool)
2 . . . Loader
5 . . . Bed
6 . . . Spindle (Processing equipment)
7 . . . Tool post (Processing equipment)
16 . . . Travel rail (Guide unit)
19 . . . Movable body
20 . . . Support frame structure
22 . . . Stand
30A, 30B . . . Reinforcement member
30A1, 30A2 . . . Reinforcement member
31 . . . Throughhole
W . . . Work

What is claimed is:

1. A machine tool system, comprising:
a machine tool including a bed and a processing equipment disposed above the bed which processes a work;
a loader which loads and unloads the work relative to the machine tool, the loader including a guide unit disposed above the machine tool and a movable body movable along the guide unit to load and unload the work onto and from the processing equipment of the machine tool; and
a support frame structure which supports the loader, the support frame structure including:
left and right stands disposed on a floor surface on left and right sides of the bed to support the guide unit from below, and
a reinforcement member which is inserted in a throughhole defined in the bed so as to extend in a leftward and rightward direction in a non-contact fashion without contacting an inner face of the throughhole, the reinforcement member having left and right ends connected respectively with vertically halfway portions of the left and right stands.

2. The machine tool system as claimed in claim 1,
wherein the support frame structure comprises at least two reinforcement members, at a front and a rear of the support frame structure, and
wherein at least one of the reinforcement members is inserted through the throughhole in the non-contact fashion without contacting the inner face of the throughhole while the other reinforcement member or members is/are not inserted through the throughhole.

3. The machine tool system as claimed in claim 1,
wherein the processing equipment is a parallel double spindle type lathe having two spindles, extending leftwardly and rightwardly parallel to each other,
wherein the bed comprises two beds having respective spindles installed thereon, the two beds being separate from each other and being disposed in left and right positions, the two beds being provided with throughholes extending leftwards and rightwards, and
wherein the reinforcement member is inserted through the throughholes in the two beds.

4. The machine tool system as claimed in claim 2,
wherein the processing equipment is a parallel double spindle type lathe having two spindles, extending leftwardly and rightwardly parallel to each other,
wherein the bed comprises two beds having respective spindles installed thereon, the two beds being separate from each other and being disposed in left and right positions, the two beds being provided with throughholes extending leftwards and rightwards, and
wherein at least one of the reinforcement members is inserted through the throughholes in the two beds.

5. The machine tool system as claimed in claim 1, wherein the support frame structure comprises a second reinforcement member, and the left and right stands are connected with each other by the reinforcement member and the second reinforcement member, which are crossed with each other when viewed from the front.

6. The machine tool system as claimed in claim 2, wherein two reinforcement members are inserted through the throughhole without contacting the inner face of the throughhole, the two reinforcement members being crossed with each other when viewed from the front, and
wherein a third reinforcement member is not inserted through the throughhole.

7. The machine tool system as claimed in claim 3,
wherein the support frame structure comprises a second reinforcement member, and the left and right stands are connected with each other by the reinforcement member and the second reinforcement member, which are crossed with each other when viewed from the front, and
wherein the reinforcement member and the second reinforcement member are inserted through the throughholes in the two beds.

8. The machine tool system as claimed in claim 4, wherein two reinforcement members are inserted through the throughhole without contacting the inner face of the throughhole, the two reinforcement members being crossed with each other when viewed from the front, and
wherein a third reinforcement member is not inserted through the throughhole.

* * * * *